Patented Nov. 17, 1931

1,832,737

UNITED STATES PATENT OFFICE

HABIB RASSI, OF BROOKLYN, NEW YORK, ASSIGNOR TO ZENOBIA COMPANY, INC., OF NEW YORK, N. Y., A CORPORATION OF NEW YORK

PROCESS OF COATING NUTS

No Drawing.   Application filed April 11, 1930. Serial No. 443,624.

The present invention while capable of a wider range of utility, is primarily concerned with the provision of a pistachio nut food product with the method of making it, and with the coating compound which is utilized. More specifically, the invention concerns itself with the provision of a white harmless and preservative compound for the shell of the nut, with the treatment of the nut to flavor and preserve it and the product resulting from such treatment.

*The nature of the raw article to be treated*

In nature the hard smooth shell which encloses the kernel of the pistachio nut is itself enclosed in outer husk. Upon removal of this husk, the outer surface of the shell has a somewhat gummy substance thereat which is probably residue left by the husk.

*History*

In Syria, Persia, Italy and other countries where the nuts are grown, the natives have for many years practiced a comparatively crude treating process designed primarily to salt the shelled nut after its removal from the burr and thus to flavor it.

In accordance with this treatment, the nuts were first roasted, incidently hardening and rendering non-adhesive any gum at or in the region of the shell, and after roasting the nuts were treated with a salt brine solution and thereafter sun-dried.

Certain of the salt crystals left on the shells by the evaporation of the brine became lodged in the various crevices and crannies of the shell and imparted to the shell a dirty grayish appearance. The connection of these crystals with the shell was so feeble that when the nuts were packed in cans and shipped, much of the salt became dislodged during transport. When a 25-pound can of nuts, so treated, arrived in the United States from the near East, there was usually very little salt remaining on the shells of the nuts, and about a pound or so of dislodged salt would be found in the bottom of the can.

The first material improvement made on the Oriental process, and one which has proved highly effective in practice, is the treating process exemplified by Reissue Patent No. 15,902, granted August 26, 1924 to Salim Zaloom. In accordance with the method of this patent, the nuts during, or subsequent to the roasting, were treated with a solution possessing primarily saline characteristics, but containing enough mucilaginous material to cause the deposition of a relatively heavy salt coating on the shells of the nuts, as well as to season and salt the kernels of them. Certain fundamental distinctions between this and the Oriental process was the fact that the salt coating was dull white and evenly distributed and adhesively secured upon the shell. Furthermore, despite the much heavier coating applied, there was no tendency to dislodge the salt coating, even when the nuts were shipped long distances and encountered the usual vicissitudes of careless transportation.

*Objects of the present invention*

The present invention is concerned with a modification of the patented product and process, and while the invention is within the purview of the Zaloom patent, it presents certain beneficial features of expedition, simplification and economy in the process, while producing a commercially satisfactory product.

These results are accomplished by carrying out the entire roasting, salting and coating process simultaneously within a roasting chamber in less time than has heretofore been required, and by making use of the inherent stickiness at or in the region of the shell surface and developing this stickiness to a point where it is of material assistance in causing adherence of the coating to the shell.

*Specification*

In carrying out the invention I place the raw nuts, that is to say, the nuts including the hard shells with such gum as may adhere to them into a roasting and agitating chamber, such, for instance, as a standard Burns coffee roaster, and feed into such chamber a hot aqueous solution of a strongly saline character (usually heated to the boiling point). This solution drips or is sprayed continuously or intermittently on the nuts during the roasting process.

In consequence, what happens in the roaster is this: The shells of the nuts are kept sufficiently wet and cool by the liquid sprayed upon them, to prevent the destruction of the adhesive qualities of the gum thereon by the flame of the roaster. The application of moisture and heat serves to develop the natural adhesive qualities of the gum and renders the shells of the nuts sufficiently sticky to retain firmly such salt crystals as may adhere to them, as the moisture contained in the brine solution is evaporated by the heat of the roaster. The process is continued until the nuts have been fully roasted and a coating deposited substantially over the surface of the shell.

I have found that the coating will be more smooth and homogeneously distributed over the surface of the nut if the coating solution is sprayed or blown in highly atomized form into the roaster. Many methods of atomizing may be employed, one simple method being merely to slowly drip the solution in front of a strong fan which blows it (in the form of small particles) into the roaster. The coating according to this process is autogenously bonded to the shell without the need for any adhesive agency foreign to the nut itself.

In order to render the coating thicker, I may in accordance with the teachings of the Zaloom patent, add to the brine solution some adhesive medium, such, for instance, as gum Arabic or starch, this medium permitting the coating to be built up to any desired degree of thickness.

In accordance with another feature of the invention, the brine may include calcium phosphate or citric acid or both. Calcium phosphate enhances the whiteness of the shell of the nut. Citric acid has a bleaching effect on the shell of the nut. When calcium phosphate and citric acid are used conjointly they react in the hot water to form a compound which is itself adhesive, such for instance as a calcium citrate or some other compound of calcium which has a phosphate radical and a citric acid radical, the compound having distinct adhesive characteristics.

It will, of course be understood that the use of citric acid and calcium phosphate with salt and with or without other adhesive ingredients is advantageous, even where the nuts have been roasted prior to the application of the coating material. Where these ingredients are used together, it is desirable, to continuously agitate the brine solution, to prevent the calcium phosphate from settling out.

During the coating process, it will be understood that the kernel of the nut, being highly absorbent, takes up much of the brine solution and is thereby flavored and seasoned. Other flavoring ingredients may be included in the brine mixture. The process is peculiarly effective to retain the full natural flavor of the nut, since by keeping the temperature of the nuts low during the roasting and coating operation, I do not distil off delectable essential oils, which impart to the nut its characteristic and delightful flavor.

That part of the invention disclosed herein which is concerned with the particular ingredients other than the salt that are added to the nut, such as the calcium phosphate and the citric acid, is made the subject of divisional application, Serial No. 566,782, filed October 3, 1931.

It will thus be seen that there is herein described a method, a product and a compound in which the several features of this invention are embodied and by which the various objects of the invention are attained and that the invention is well suited to meet the requirements of practical use.

As many changes could be made in the above method, product and treating compound and many apparently widely different embodiments of this invention could be made without departing from the scope thereof, it is intended that all matter contained in the above description shall be interpreted as illustrative and not in a limiting sense.

Having thus described my invention, what I claim as new and desire to secure by Letters Patent is:—

1. A method of autogenously bonding a coating to pistachio nuts in the shell which includes the steps of developing the adhesive quality of the same by the application of moisture and heat thereto in the region of the hard shell surface and depositing a coating thereon.

2. A method of coating pistachio nuts which includes the steps of developing the adhesive quality of the same by the addition of moisture and heat thereto in the region of the shell surface and depositing a coating on the shell, by evaporating a salt brine solution from the surface of the nut while the latter is sticky.

3. A method of simultaneously roasting and coating pistachio nuts in the shell which consists of subjecting the nuts to an agitating action and a roasting heat while spraying with a cooling saline solution in finely atomized form whereby the adhesive quality in the region of the hard shell is developed while the solution is quickly evaporated resulting in a hard, smooth, homogeneous coating autogenously bonded to the shell.

Signed at New York, in the county of New York and State of New York, this 7th day of April, A. D. 1930.

HABIB RASSI.